United States Patent
Lee et al.

(10) Patent No.: US 12,238,108 B2
(45) Date of Patent: Feb. 25, 2025

(54) COMMUNICATION PLATFORM SERVER INTEGRATION

(71) Applicant: Ramp Business Corporation, New York, NY (US)

(72) Inventors: Calvin Jun-Gong Lee, Weehawken, NJ (US); Ariel Petren Langer, New York, NY (US); Geoffrey Jacques Charles, Brooklyn, NY (US); Tae Kyung Kong, Bayside, NY (US); Akash Wadawadigi, New York, NY (US)

(73) Assignee: Ramp Business Corporation, New York, NY (US)

( * ) Notice: Subject to any disclaimer, the term of this patent is extended or adjusted under 35 U.S.C. 154(b) by 470 days.

(21) Appl. No.: 17/390,705

(22) Filed: Jul. 30, 2021

(65) Prior Publication Data

US 2023/0034394 A1      Feb. 2, 2023

(51) Int. Cl.
*H04L 9/40* (2022.01)
*G06F 40/279* (2020.01)
(Continued)

(52) U.S. Cl.
CPC .......... *H04L 63/102* (2013.01); *H04L 51/046* (2013.01); *H04L 51/216* (2022.05);
(Continued)

(58) Field of Classification Search
CPC ....... H04L 63/08; H04L 63/10; H04L 63/101; H04L 63/102; H04L 63/126;
(Continued)

(56) References Cited

U.S. PATENT DOCUMENTS

| | | | |
|---|---|---|---|
| 11,233,647 B1* | 1/2022 | Fontaine | H04L 9/3215 |
| 11,665,150 B2* | 5/2023 | Stachura | H04L 63/168 |
| | | | 713/168 |

(Continued)

FOREIGN PATENT DOCUMENTS

| | | | |
|---|---|---|---|
| WO | WO 2008/027621 A1 | 3/2008 | |
| WO | WO-2009152227 A2 * | 12/2009 | G06F 16/248 |
| WO | WO-2017212339 A1 * | 12/2017 | |

OTHER PUBLICATIONS

United States U.S. Appl. No. 17/351,120, filed Jun. 17, 2021, Inventors Calvin Jun-Gong Lee, Veeral Dilip Patel, Paul Alexander Meier, Karim Atiyeh, Ariel Petren Langer, Ori Ephraim Goldfield, and Geoffrey Jacques Charles (copy not enclosed).

(Continued)

*Primary Examiner* — James N Fiorillo
(74) *Attorney, Agent, or Firm* — Fenwick & West LLP

(57) ABSTRACT

A system for flexible account creation and approval includes a computing server and a communication platform server that operates independently of the computing server. The computing server is configured to receive an account creation request initiated through interfaces of the communication platform server or the computing server. The computing server facilitates approval of the requests, which can include sending request approvers the request for review at interfaces of the communication platform server or the computing server. By enabling account creation and approval through various servers that can access the same information to provide consistent experiences, the system offers users more flexibility in choosing one of the available servers.

20 Claims, 8 Drawing Sheets

(51) Int. Cl.
*H04L 51/046* (2022.01)
*H04L 51/216* (2022.01)
*H04L 67/133* (2022.01)
*H04L 67/54* (2022.01)

(52) U.S. Cl.
CPC ........ *H04L 63/0807* (2013.01); *H04L 63/101* (2013.01); *H04L 67/54* (2022.05); *G06F 40/279* (2020.01); *H04L 67/133* (2022.05)

(58) Field of Classification Search
CPC ............ H04L 63/0407; H04L 63/0428; H04L 63/0807; H04L 63/0823; H04L 51/04; H04L 51/046; H04L 51/216; H04L 67/54; H04L 67/133; G06F 40/279; G06F 16/9535; G06F 21/31; G06F 21/41; G06K 19/06037; H04W 12/06; H04W 48/14; G06Q 30/016; G06Q 30/0234; G06Q 20/10; G06Q 20/40; G06Q 50/01
USPC ........................................................ 709/206
See application file for complete search history.

(56) References Cited

U.S. PATENT DOCUMENTS

| | | | | |
|---|---|---|---|---|
| 2006/0123338 A1* | 6/2006 | McCaffrey | ............ | G06F 40/163 715/256 |
| 2012/0278733 A1* | 11/2012 | Knight | .................. | G06Q 10/10 715/752 |
| 2013/0110946 A1* | 5/2013 | Bradshaw | ........... | H04L 12/6418 709/206 |
| 2013/0311559 A1* | 11/2013 | Swinson | ................ | G06Q 10/06 709/204 |
| 2014/0013247 A1* | 1/2014 | Beechuk | .............. | G06Q 10/101 715/753 |
| 2015/0046206 A1* | 2/2015 | Kelley | ................... | G06Q 30/04 705/7.13 |
| 2015/0134956 A1* | 5/2015 | Stachura | ............. | H04L 63/0815 713/168 |
| 2015/0200950 A1* | 7/2015 | Meunier | ................ | G06Q 20/40 726/4 |
| 2015/0302498 A1* | 10/2015 | Barton | .................. | G06Q 20/12 705/26.4 |
| 2015/0332306 A1* | 11/2015 | Marks | .................... | G06Q 30/00 705/14.34 |
| 2016/0037331 A1* | 2/2016 | Vernon | ................... | H04L 51/58 455/414.1 |
| 2016/0142390 A1* | 5/2016 | Draegen | ............... | H04L 51/212 726/9 |
| 2018/0158068 A1* | 6/2018 | Ker | ........................ | H04L 67/535 |
| 2018/0183619 A1* | 6/2018 | Jayaram | .................. | H04W 4/12 |
| 2018/0352430 A1* | 12/2018 | Mansour | ............. | H04W 12/069 |
| 2019/0036914 A1* | 1/2019 | Tzur-David | .......... | H04L 9/0861 |
| 2019/0197231 A1* | 6/2019 | Meier | ................. | H04L 63/0407 |
| 2020/0106780 A1* | 4/2020 | Malliah | ................. | G06F 16/437 |
| 2020/0183928 A1* | 6/2020 | Wu | ........................ | G06N 5/022 |
| 2020/0274835 A1* | 8/2020 | McCue | ................ | H04L 51/48 |
| 2021/0036972 A1* | 2/2021 | Kharshak | ................ | G06F 21/31 |
| 2021/0103700 A1* | 4/2021 | Toplyn | .................. | G06N 20/00 |
| 2021/0117942 A1* | 4/2021 | Cottingham | ......... | G06Q 20/384 |
| 2022/0076236 A1* | 3/2022 | Bodalia | ................ | G06Q 20/204 |

OTHER PUBLICATIONS

Canadian Intellectual Property Office, Office Action, Canadian Patent Application No. 3,167,534, Oct. 26, 2023, 4 pages.

* cited by examiner

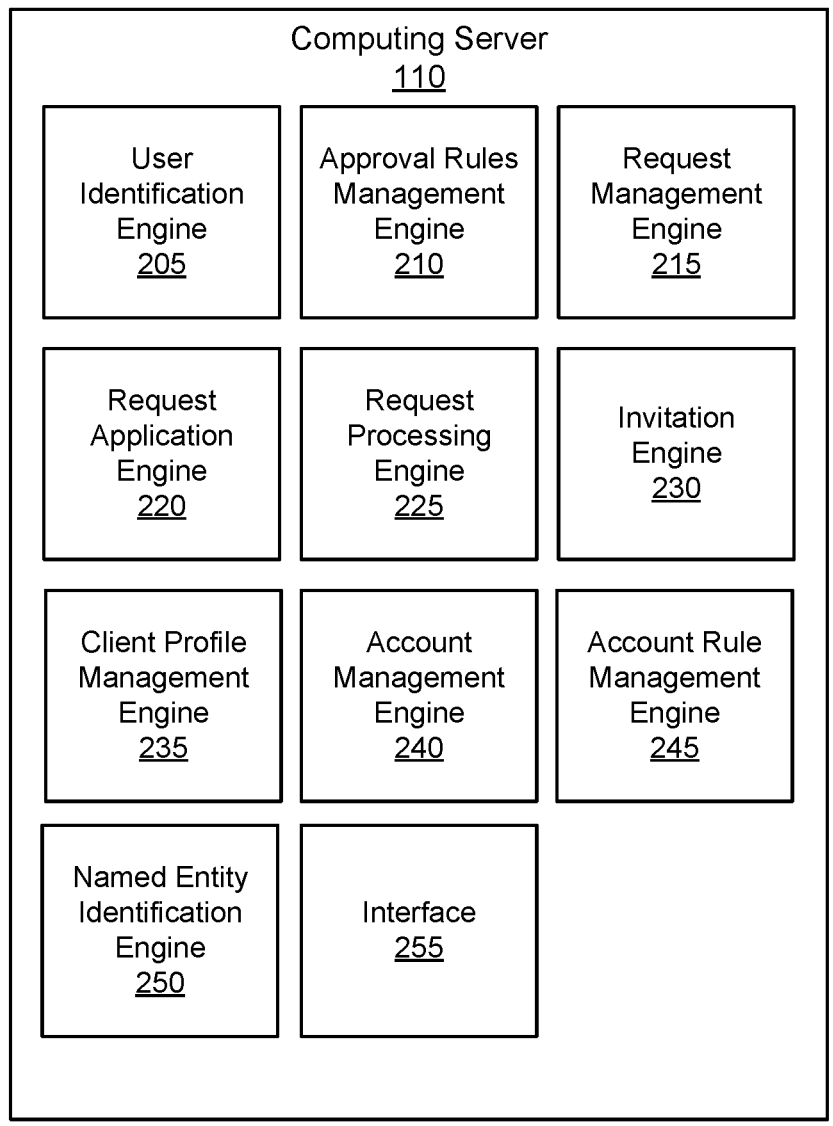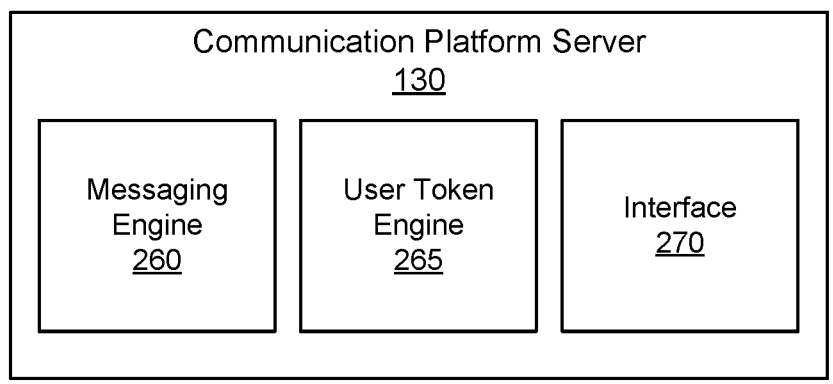
FIG. 2

Noah's Chats

Innovation Program

Marketing a

> Upcoming Ev

Policies

School Outrea

Friday Softba

William Lane

Haoyu Wu

Carol Silverstone

Jimin Park

Milind Mehta

9:55 AM
k conf this
corporate
expenses.

Post ▶

510

ơ ×

Create a Card

Create a new card with its own limit and spend rules.

Card Name

Type a card name...

Card Type

Select a card type... ∨

Note: Maximum one (1) physical card per user.

Amount

Type an amount...

Ex: $100.

Frequency

Select a frequency... ∨

Select when the limit should reset.

Auto-lock Date (optional)

Select a date... ∨

Cancel | Create Card

Card Approval Requests

Search & Filter

| | Requester | Card Type | Amount | Auto-Lock Date |
|---|---|---|---|---|
| 711 { | Noah Bowman | Physical | $500 | 12/31/21 |
| 712 { | Megan Yen | Digital | $5000 | 8/31/21 |
| | Katrim Atiyeh | Physical | $600 | 9/31/21 |
| | Tyn Gunn | Digital | $5000 | 10/31/21 |
| | Matt Sheek | Physical | $500 | 11/31/21 |
| | Katrina Sloan | Digital | $2000 | 7/31/22 |
| | Karim Atul | Physical | $600 | 6/31/22 |
| | Lewis Drumond | Digital | $100 | 5/31/22 |
| | Cameron Lewis | Physical | $500 | 4/31/22 |

Sidebar: Insights, Transactions, Cards, People, Bill Pay, Vendors, Reimburse, Accounting, Card Approval Requests, My Card, Earn $250

*FIG. 7*

COMMUNICATION PLATFORM SERVER INTEGRATION

TECHNICAL FIELD

The present disclosure generally relates to account creation using a communication platform server and, particularly, account creation performed across one or more platforms and integrated through interfaces among the platforms.

BACKGROUND

The efficiency of a computing system often depends on the speed of software, interoperability, and the degree of integration with various functionalities. Computing systems, especially in an enterprise environment, have become increasingly complex as more software applications are installed in a system. Servers are often delegated specific roles or functions to increase operating efficiency. However, this delegation deprioritizes inter-server functionality. That is, a first server or two independently operating servers is not inherently configured to provide client access to the first server's functionality at the second server. For account management processes within an organization, various parties of the organization may need to approve the request. Existing systems may require the approvers to log into a central account management server to access the management server's functionalities. For example, a server may host a website for administrating an approval process. In this way, existing systems often cause burden to stakeholders by requiring them to take extra steps to log in to a system that may not be regularly used by some of them. Also, existing systems often delay a transaction because of non-responsiveness from one or more required approvers who may inadvertently forgot to log in to the central system or may not even be notified to take any action.

SUMMARY

Embodiments are related to flexible account management that integrates a computing server's and a communication platform server's functionalities. In one embodiment, a system includes an instant messaging platform server and a computing server. The computing server enables workspaces members in an organization to initiate and approve account creation requests. The instant messaging platform server generates a messaging thread for the workspace members. The messaging thread can be used to submit an account creation request. A workspace member can initiate an account creation request through a keyword string entered in the instant messaging platform server. Following this request initiation, the computing server receives a user token from the instant messaging platform. The token is associated with the account creation request and can be used to identify the workspace member of the organization. The computing server can determine, using the user token, whether the workspace member has access privileges to create an account managed by the computing server. The computing server can display a set of input fields (e.g., entries in an account creation flow) through an application (e.g., a web application) operated by the computing server or cause the instant messaging platform server to generate the set of input fields within the instant messaging platform server (e.g., within a messaging thread). The computing server can initiate an account creation process to create the account after the workspace member has provided information as input for the set of input fields.

This general architecture has applications in various areas, such as a credit card request process. For example, a credit card management server may host a dedicated application or website for clients of the credit card management server to create and approve credit cards. These clients may also be clients of independently operated communication platform servers such as an instant messaging application, which the clients can access at a higher frequency than a dedicated application. By allowing options for completing a credit card creation flow at a dedicated application or an independently operated instant messaging application, the credit card management server enables flexible access to the credit card management server's functions and increases the speed of processes that would otherwise have had limited accessibility (e.g., at the dedicated application).

BRIEF DESCRIPTION OF THE DRAWINGS

FIG. 2 includes block diagrams illustrating components of an example computing server and an example communication platform server, in accordance with an embodiment.

FIG. 5 illustrates an account creation request portal on a communication platform server interface, in accordance with an embodiment.

FIG. 6 illustrates a request approval messaging thread on a communication platform server interface, in accordance with an embodiment.

FIG. 7 illustrates an account creation management interface, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Overview

Figure 1:
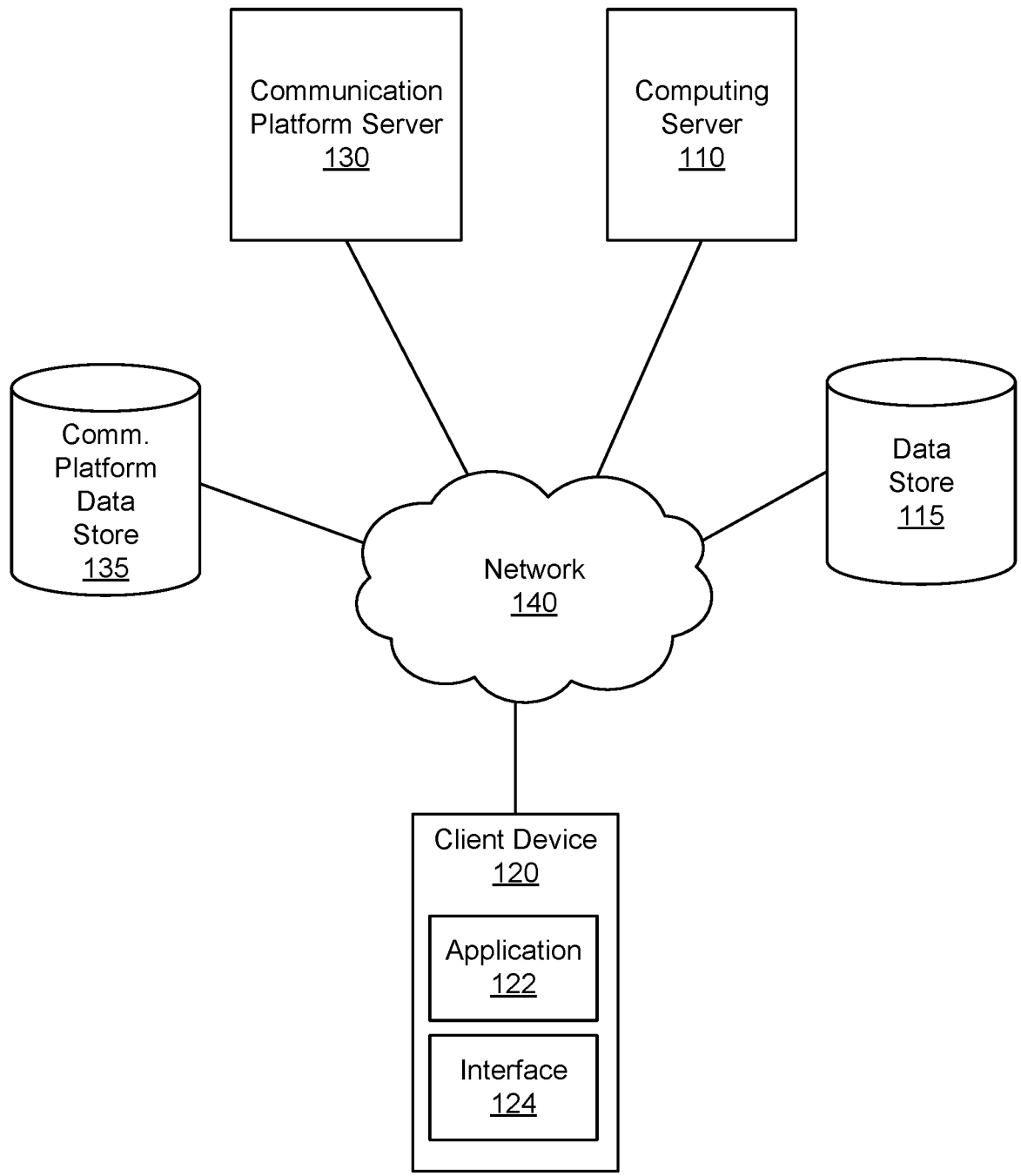
FIG. 1 is a block diagram illustrating an example account creation request system environment, in accordance with an embodiment.

Figure (FIG. 1 is a block diagram that illustrates an example account creation request system environment 100, in accordance with an embodiment. The system environment 100 includes a computing server 110, a datastore 115, a client device 120, a communication platform server 130, and a communication platform server datastore 135. The entities and components in the system environment 110 communicate with each other through network 140. In various embodiments, the system environment 100 includes fewer or additional components. In some embodiments, the system environment 100 also includes different components. While each of the components in the system environment 100 is described in a singular form, the system environment 100 may include one or more of each of the components. For example, the computing server 110 can cause various communication platform servers to receive account creation requests from various client devices.

The computing server 110 includes one or more computers that perform various tasks related to initiating and processing account creation requests of various clients of the computing server 110. An "account" may be a form of resource access such as a credit card account for accessing credit or a data storage account for accessing digital files. For example, the computing server 110 enables the request and approval of credit cards requested by workspace members of an organization (e.g., corporate credit cards) at the communication platform server 130. The computing server 110 interacts with account creation requests and approvals made at the client device 120 through the communication platform server 130. Additionally, the computing server 110 performs similar credit card request and approval functions, interacting directly with the client device 120. Examples of components and functionalities of the computing server 110 are discussed in further detail below with reference to FIG. 2. The computing server 110 may provide a software as a service (SaaS) platform for various clients to request and approve accounts.

The data store 115 includes one or more computing devices that include memories or other storage media for storing various files and data of the computing server 110. The data stored in the data store 115 includes account creation requests, workspace member information, organization information, account settings, access privilege rules, request approval rules, and other data associated with account requests managed by computing server 110. In various embodiments, the data store 115 may take different forms. In one embodiment, the data store 115 is part of the computing server 110. For example, the data store 115 is part of the local storage (e.g., hard drive, memory card, data server room) of the computing server 110. In some embodiments, the data store 115 is a network-based storage server (e.g., a cloud server). The data store 115 may be a third-party storage system such as AMAZON AWS, DROPBOX, RACKSPACE CLOUD FILES, AZURE BLOB STORAGE, GOOGLE CLOUD STORAGE, etc. The data in the data store 115 may be structured in different database formats such as a relational database using the structured query language (SQL) or other data structures such as a non-relational format, a key-value store, a graph structure, a linked list, an object storage, a resource description framework (RDF), etc. In one embodiment, the data store 115 uses various data structures mentioned above.

A client device 120 is a device that enables the holder of the device 120 to interact with a party, such as requesting an account through an interface of the computing server 110 or the communication platform server 130 displayed on the client device 120. Examples of client devices 120 include a personal computer (PC), a tablet PC, a smartphone, a wearable device, or any suitable device capable of executing instructions that specify actions to be taken by that device. The client device 120 may include a processor (e.g., a central processing unit (CPU), a graphics processing unit (GPU), a digital signal processor (DSP), one or more application specific integrated circuits (ASICs), one or more radio-frequency integrated circuits (RFICs), or any combination of these), a memory, a user interface to receive user inputs or provide outputs to the user (e.g., a visual display interface including a touch-enabled screen, a keyboard, microphone, speakers, etc.). The visual interface may include a software driver that enables displaying user interfaces on a screen (or display). A client uses the client device 120 to communicate with the computing server 110 and perform various account management related tasks such as creating accounts, approving the requests to create accounts, creating or modifying rules for approving the requests, or editing an existing account. The user of the client device 120 may be a manager, an accounting administrator, or a general workspace member of an organization. A workspace member may be an employee of an organization.

The application 122 is a software application that operates at the client device 120. A client device 120 may be installed with various applications 122. For example, in a first application 122, it is published by the party that operates the computing server 110 to allow clients to communicate with the computing server 110. For example, the application 122 may be part of a SaaS platform of the computing server 110 that allows a client to request accounts, approve the requests, or other suitable functions for managing accounts. In a second application 122, it is a messaging platform application provided by communication platform server 130. Workspace members of an organization may use the messaging platform to communicate with each other and perform various actions. In various embodiments, an application 122 may be of different types. In one embodiment, an application 122 is a web application that runs on JavaScript and other backend algorithms. In the case of a web application, the application 122 cooperates with a web browser to render a front-end interface 124. In another embodiment, an application 122 is a mobile application. For example, the mobile application may run on Swift for iOS and other APPLE operating systems or on Java or another suitable language for ANDROID systems. In yet another embodiment, an application 122 may be a software program that operates on a desktop computer that runs on an operating system such as LINUX, MICROSOFT WINDOWS, MAC OS, or CHROME OS.

An interface 124 is a suitable interface for a client to interact with the computing server 110 or the communication platform server 130. The client may communicate to the application 122 and the servers 110 and 130 through the interface 124. The interface 124 may take different forms. In one embodiment, the interface 124 may be a web browser such as CHROME, FIREFOX, SAFARI, INTERNET EXPLORER, EDGE, etc. and the application 122 may be a web application that is run by the web browser. In one embodiment, the interface 124 is part of the application 122. For example, the interface 124 may be the front-end component of a mobile application or a desktop application. In one embodiment, the interface 124 also is a graphical user interface (GUI) which includes graphical elements and user-friendly control elements. In one embodiment, the interface 124 does not include graphical elements but communicates with the servers 110 and 130 via other suitable ways such as application program interfaces (APIs), which may include conventional APIs and other related mechanisms such as webhooks.

The communication platform server 130 is a server that manages a communication platform. A communication platform allows one or more users to participate in any number of conversations with others, such as in the form of private chats, group chat, chatrooms, forums, etc. The conversations between users may take the form of text messages, image messages, voice messages, video conferences, etc. Text messages may include text strings using alphabetical letters, numbers, foreign letters and characters, and other suitable text. Text messages may also include other symbols, graphics, ideograms such as EMOJI, customized image messages, etc. A communication platform may take the form of an instant messenger, a business communication platform, a streaming platform, a videoconferencing platform, an email platform, a social networking system, a forum, a blog, a comment platform, etc. Examples of workspace messenger includes SLACK, MICROSOFT TEAMS, GOOGLE CHAT, DISCORD, MATTERMOST, etc. Examples of instant messaging platforms include WHATSAPP, TELEGRAM, SLACK, WECHAT, LINE, FACEBOOK MESSENGER, SNAPCHAT, GOOGLE HANGOUTS, SKYPE, etc. In some embodiments, a communication platform server 130 may take the form of a server for other services that are not primarily for communications but also provide the messaging functionality for users.

A communication platform provided by the communication platform server 130 may allow various third parties to build in-app applications that communicates third party server using API and webhook. For example, in one embodiment, the computing server 110 operates an in-app application inside a workspace messenger. The application operated by the computing server 110 may be invoked by a user within the messenger through various suitable mechanisms such as launching the application inside the messenger, entering a key launch phrase, and reacting to a prompt. When the application is launched inside the messenger, the communication platform server 130 may provide information such as user actions in the form of a webhook payload. The computing server 110 may also communicate with the communication platform server 130 through an API call.

The communication platform server data store 135 is a data store for the communication platform server 130. The communication platform server data store 135 stores data to enable communication between clients of the communication platform server 130. The communication platform server data store 135 may store client information such as addresses for contact (e.g., email address, residential address, employer address, or internet protocol (IP) address), records of communication (e.g., messaging threads, Short Message Service (SMS) messages, or emails), records of participants in a conversation, time and date of a conversation, location of a conversation, or any suitable information related to communication between parties. In one embodiment, each message in the communication platform is stored in the data store 135 with a unique message identifier and a timestamp. The record of the message may be retrieved by the communication platform server 130 and also other servers such as the computing server 110 through an API call for messages that the computing server 110 has access privilege. In one embodiment, the communication platform server data store 135 is local to the communication platform server 130. In other embodiments, the communication platform server data store 135 is a Cloud database but has a simplified data structure and fewer data compared to the data store 115.

Various servers in this disclosure may take different forms. In one embodiment, a server is a computer that executes code instructions to perform various processes described in this disclosure. In another embodiment, a server is a pool of computing devices that may be located at the same geographical location (e.g., a server room) or be distributed geographically (e.g., clouding computing, distributed computing, or in a virtual server network). In one embodiment, a server includes one or more virtualization instances such as a container, a virtual machine, a virtual private server, a virtual kernel, or another suitable virtualization instance.

The network 140 provides connections to the components of the system environment 100 through one or more sub-networks, which may include any combination of local area and/or wide area networks, using both wired and/or wireless communication systems. In one embodiment, a network 140 uses standard communications technologies and/or protocols. For example, a network 140 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 140 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 140 may be represented using any suitable format, such as hypertext markup language (HTML), extensible markup language (XML), JavaScript object notation (JSON), structured query language (SQL). In some embodiments, some of the communication links of a network 140 may be encrypted using any suitable technique or techniques such as secure sockets layer (SSL), transport layer security (TLS), virtual private networks (VPNs), Internet Protocol security (IPsec), etc. The network 140 also includes links and packet switching networks such as the Internet. In some embodiments, a data store belongs to part of the internal computing system of a server (e.g., the communication platform server data store 135 may be part of the communication platform server 130). In such cases, the network 140 may be a local network that enables the server to communicate with the rest of the components.

Example Server Components

FIG. 2 includes block diagrams illustrating components of an example computing server 110 and an example communication platform server 130, in accordance with an embodiment. The computing server 110 includes a user identification engine 205, an approval rules management engine 210, a request management engine 215, a request application engine 220, a request processing engine 225, an invitation engine 230, client profile management engine 235, account management engine 240, account rule management engine 245, named entity identification engine 250, and an interface 255. The communication platform server 130 includes a messaging engine 260, a user token engine 265, and an interface 270. In various embodiments, the two servers may include fewer or additional components. The two servers also may include different components. The functions of various components may be distributed in a different manner than described below. Moreover, while each of the components in FIG. 2 may be described in a singular form, the components may present in plurality. The components may take the form of a combination of software and hardware, such as software (e.g., program code comprised of instructions) that is stored on memory and executable by a processing system (e.g., one or more processors).

The user identification engine 205 determines and verifies the identity of a source of the account request. The source of the account request may be a workspace member for which the account is designated, a workspace member requesting an account on behalf of another member, or an automated process associated with a workspace member (e.g., a human resources manager signs off on the automated creation of a credit card for each employee when hired). The user identification engine 205 can determine the identity of the source by processing a user token received from the communication platform server 130. The user identification engine 205 may verify the determined identity using one or more rules for determining access privileges using the user token.

The user identification engine 205 may receive an account creation request from a workspace member of an organization. The account creation request may be initiated in a communication platform server through a keyword string entered by the workspace member in the communication platform server. For example, the communication platform server 130 may be an instant messaging application hosting a messaging thread in which a workspace member can enter the keyword string "/app_name cards new." The communication platform server 130 receives the keyword string and determines the inclusion of an "app_name" as a command of launching the application of the computing server 110 in the communication platform. The communication platform server 130 further extracts the keyword "new" from the string to determine that the workspace member has requested a new credit card. Upon identifying the keyword "new" from the string, the communication platform server 130 transmits a webhook notification to the computing server 110 to notification the computing server 130. In turn, the user identification engine 205 may prompt the communication platform server 130 to provide a user token associated with the account creation request. The user token can be used by the user identification engine 205 to determine whether the source of the request (e.g., a workspace member) has an access privilege to create an account managed by the computing server. The user token is further described in the description of the user token engine 265 of the communication platform server 130.

The user identification engine 205 may query a table of user tokens using the received user token to determine if the source has access privileges, where entries in the table indicate whether the workspace member associated with a user token is permitted to create an account. The user identification engine 205 can alternatively or additionally apply one or more access rules to a string of the user token to determine whether the source of the request has access privileges. In some embodiments, an access rule specifies that email domains are used to identify whether a source of the account request has access privileges. The user identification engine 205 compares an email domain of the source with an email domain of the computing server 110. The email domain of the source can be identified using the user token. The email domain of the source may be used by the source to access the communication platform server. For example, a workspace member of a company "Example, Inc." is using Instant Messenger+ to create a credit card with Cards on computing server 110, which is associated with a domain name of "cards.eg." The workspace member uses an email domain "cards.eg" as part of their login credentials to use Instant Messenger+. The user token of that workspace member may include "cards.eg," and one of the access rules of the user identification engine 205 may specify that all requests made by sources having the same email domain as the domain of the computing server 110 have access privileges to create an account with the computing server 110.

Additionally, an access rule may specify that a request made by a source with a pre-authorized domain may have access privileges. For example, a workspace member of the company "Example, Inc." is using an email address with domain "example.net" to access the communication platform server 130 to create a credit card using the services of the computing server 110 of company Cards, Inc., which is associated with a domain name of "cards.eg." Although the domain name "example.net" may differ from the domain name of the computing server 110, an access rule used by the user identification engine 205 may indicate that the domain name of "example.net" has access privileges to create an account with Cards, Inc.

After using the user token to determine if a source has access privileges to create an account managed by the computing server 110, the user identification engine 205 may enable or prevent the account creation request from being further processed. For example, if the source does not have the access privilege to create accounts, the user identification engine 205 may cause the communication platform server 130 to display a notification at the client device 120 indicating that the account creation request was denied. Otherwise, the user token indicates that the source has access privilege and the user identification engine 205 may allow the account creation process to proceed. For example, the user identification engine 205 may provide instructions to the communication platform server 130 to contact the request application engine 220. In another example, the user identification engine 205 may directly communicate with the request application engine 220 (e.g., providing the user token) to make the account creation application available at the client device 120.

The approval rules management engine 210 manages rules for approving an account creation request. These rules may be referred to herein as "approval rules." The rules may involve a request approver, a location, a time of day, account setting limits, IP addresses, organization titles, or any suitable parameter for characterizing the request. A request approver may be a human who reviews account creation requests (e.g., an authorized workspace member). In some embodiments, the approval rules management engine 210 maintains a list of request approvers that have the authority to review and approve or deny an account creation request. For example, the list of request approvers may be a list of workspace members within an organization's finance department. That is, account creation requests may be approved, edited, or denied by a member of the finance department. The approval rules management engine 210 may determine workspace members who are to be on the list of request approvers. For example, using an organization's hierarchical organization chart, the approval rules management engine 210 may determine that any workspace member having a title of "president" and those in the hierarchy above presidents may be request approvers.

The approval rules management engine 210 may maintain rules specifying contexts in which account creation requests are automatically approved or denied. Examples of contexts in which account creation requests may be made include a location at which the request was made (e.g., as recorded by GPS traces from the client device 120), the time of the day during which the account request was made, or an IP address with from which the request was received. In some embodiments, the approval rules management engine 210 may use account setting limits in rules to make approval requests decisions. For example, an approval rule may specify that any credit card creation request with a requested credit limit exceeding $5,000 is to be automatically denied. The approval rules management engine 210 may include rules that use organization titles. For example, an approval rule specifies that an account creation request made by a workspace member having the organizational title of "director" or higher may be automatically approved.

The approval rules management engine 210 may create or modify approval rules based on decisions made by request approvers. The approval rules management engine 210 may receive a log of account creation request decisions and determine one or more patterns in the log of decisions. Using the determined patterns, the approval rules management engine 210 may determine to create a new rule or modify an existing rule. For example, the approval rules management engine 210 determines a pattern that a request approver has overridden approval decisions made using an existing approval rule with a frequency exceeding a threshold frequency. The approval rules management engine 210 uses this pattern to modify the existing approval rule (e.g., to align more closely with other organizations' rules) or generate a recommendation to a request approver that the rule be changed. In another example, the approval rules management engine 210 determines a pattern in the account creation requests that a request approver has approved and generates a new approval rule based on a common parameter of the account creation requests (e.g., the requests were all made by the president of the organization).

The request management engine 215 manages the status of pending account creation requests and maintains a record of completed account creation requests. A status of a pending account creation request can describe the stage of the request in the approval process. For example, a status of a pending request may be "received," "assigned for review," "under review," "escalated," or "deescalated." A completed account creation request is a request that is not pending for review and may have a status of "approved," "denied," or "canceled." The request management engine 215 may track the status of a pending account creation request over time and determine, using the tracking, to generate a notification to a request approver. The request management engine 215 may generate this notification in one or more of an interface of the computing server 110 or an interface of the communication platform server 130. For example, the request management engine 215 determines that a request's status has been "assigned for review" longer than an average duration of that requests have this status. In response to determining the status duration is above the average duration, the request management engine 215 sends an SMS message to a request approver with a reminder to complete the review.

The request management engine 215 may determine whether a request should be prioritized and determine how the request should be communicated to a request approver for review. For example, the request management engine 215 determines that a request should be prioritized because the workspace member submitting the request holds a high job title at the organization. Upon determining the request should be prioritized, the request management engine 215 determines to assign the request to an approver with authority to review prioritized requests. Additionally, or alternatively, upon determining the request should be prioritized, the request management engine 215 determines a communication platform server that, based on past request approval logs, a request approver is most likely to review with the shortest average response time. For example, the request management engine 215 communicates with an organization's request approvers through multiple communication platform servers: email, instant messaging, and SMS. The request management engine 215 determines that approvers respond to requests to review account creation requests the fastest over instant messaging. The request management engine 215 determines to cause the communication platform server associated with the instant messaging service to display the account creation request for approval at an approver's messaging thread in the instant messaging service. The request management engine 215 may determine to send reminders at a greater frequency on one communication platform server over another based on past request approval logs showing that approvers complete the review of account creation requests faster in one communication platform server than the other.

The request management engine 215 maintains a log of completed account creation requests. The log can include, for each request, the date the request was submitted, the date the request was completed, the request approver who made a decision that caused the request to be complete, the decision made by the request approver, user-provided settings for the account during the request, or any other suitable information regarding the request. The communication platform server 130 (e.g., using the messaging engine 260) can maintain a messaging thread including a log of account creation requests. The log can be a history of messages communicated within the messaging thread. Alternatively, or additionally, the log can be a summary of account creation requests. In one example, an instant messaging platform (e.g., the communication platform server 130) can access the log maintained by the request management engine 215 to display a list of approved account creation requests. In another example, the computing server 110 can display, at an application (e.g., mobile application), the list of approved account creation requests.

The request application engine 220 initiates a creation flow (e.g., generates an application form) for a workspace member to apply for an account. In some embodiments, the request application engine 220 generates a GUI element containing input fields for entries in the creation flow (e.g., entries of an application form for an account). The input fields can include an account name, an account type, a maximum number of resources that the account can accrue or expend, a frequency at which the limit is reset, a date at which the account may be locked or disabled, or any other suitable field for creating an account with the computing server 110. The GUI element can be generated within an interface of the computing server 110 or an interface of the communication platform server 130. The request application engine 220 may receive inputs to the creation flow entries from a workspace member and provide the account creation request, including the received inputs, to the request processing engine 225, which initiates the account creation process.

The input fields generated by the request application engine 220 can be the same across both multiple interfaces. For example, input fields for the same credit card creation flow entries can be generated in an interface of the computing server 110 and in an instant messaging platform server's interface. The input fields can also differ across the interfaces (e.g., distinct input fields or at least one common input field). For example, the input fields generated on the interface of the computing server 110 can include fields that allow a workspace member to specify an existing account's name such that the present request can be auto-populated with settings of the existing account. For an instant messaging platform's interface, the request application engine 220 may not generate such input fields to allow a user to specify an existing account. An example GUI element generated using the request application engine 220 is shown in FIG. 5.

The request processing engine 225 applies approval rules to information provided by a workspace member (e.g., via entries of a creation flow) to approve or deny the account creation request. The approval request may specify request approvers, where the approvers may be contacted through different servers' interfaces. In some embodiments, the request processing engine 225 may request approval from a first set of request approvers through the communication platform server 130 (e.g., an instant messaging platform) and from a second set of request approvers through the computing server 110. In some embodiments, the request processing engine 225 first applies approval rules that do not involve a request approver, which may serve as a preliminary screening of requests to reduce the number of requests manually reviewed by request approvers. Such approval rules may deny requests based on the context of the request or inputs provided in the account creation application. For example, denying account creation requests with a requested account limit greater than a predefined limit.

Figure 6:
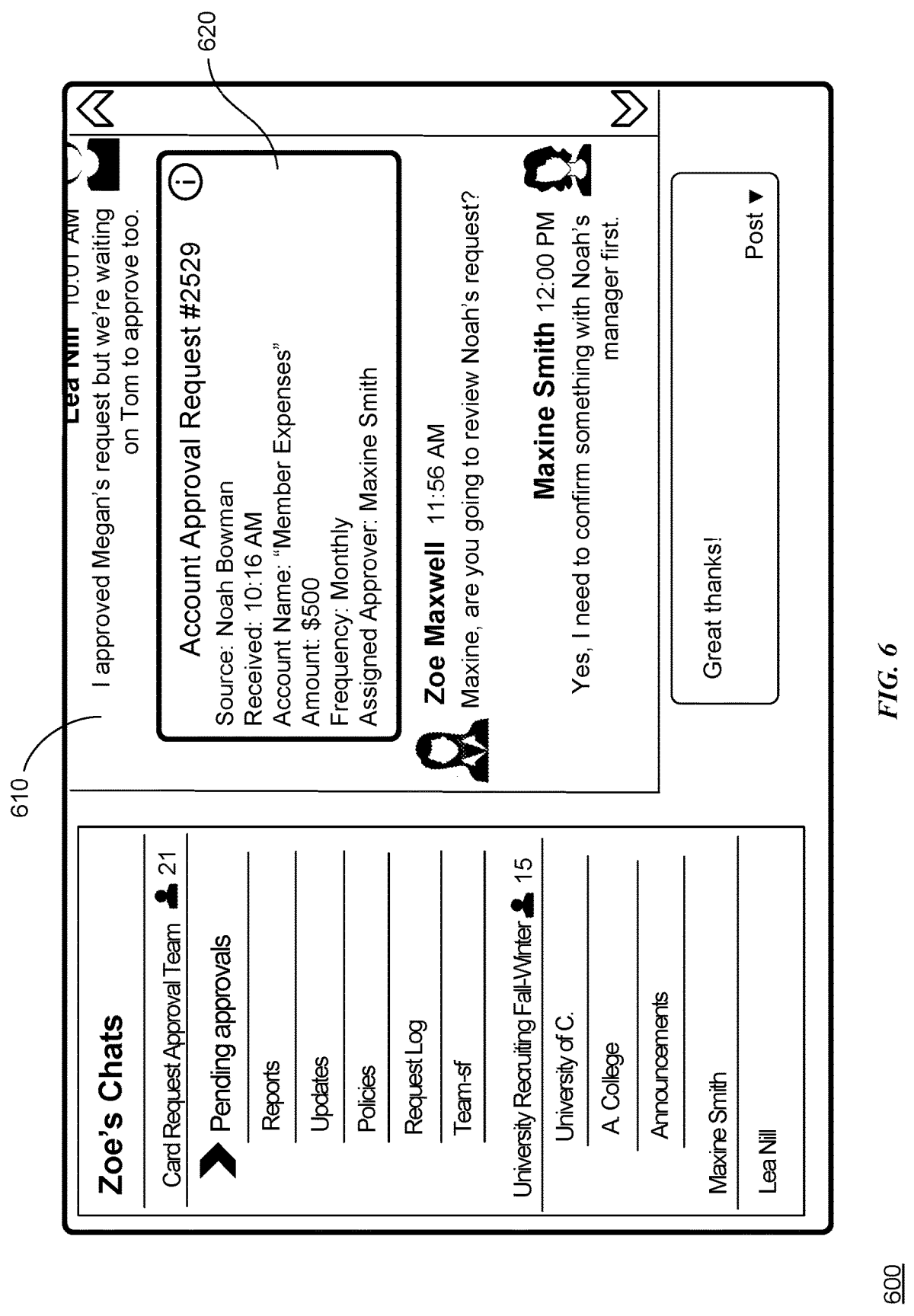

The request processing engine 225 generates the account creation requests for approval at an interface of the request approvers. The request processing engine 225 may generate a GUI element displaying one or more pending approval requests for approval. For example, the request processing engine 225 may cause a list of pending approval requests to be displayed at a messaging thread in an instant messaging platform's interface. An example of a messaging thread with a group of request approvers is shown in FIG. 6.

The request processing engine 225 may generate a GUI element that enables a request approver to modify the account settings requested by the workspace member. For example, the request processing engine 225 may initiate an API call to cause a link or button to be displayed on an instant messaging platform for the approver to edit the account settings. Upon selection of the link or button, the instant messaging platform may trigger a webhook to notify the computing server 110 regarding the user selection, which in turn causes the request processing engine 225 to provide editable input fields for the corresponding account settings requested by the workspace member. Upon receiving the request approver's edits, the request processing engine 225 may determine that the request approver has approved the request. If there are additional request approvers that are needed to approve the account creation request, the request processing engine 225 may wait until all approvers have approved the request before the status of the request can be changed to "approved."

The request processing engine 225 may receive the request approver's edits to the account settings and provide them to the workspace member who originated the account creation request for review. In response to the workspace member accepting the request approver's edits, the request processing engine 225 may initiate the creation of the account. For example, if the account request is a request for a credit card account, the request processing engine 225 may contact a credit card company or bank to obtain a credit card account for the user under the settings agreed upon between the request approver and the workspace member who originated the request.

The invitation engine 230 generates invitations for users of the computing server 110 to create an account with the computing server 110. The invitation engine 230 may receive an invitation request from a workspace member at an interface of the communication platform server 130. The invitation request may be initiated through a keyword string entered by the workspace member (e.g., "/app_name cards invite"). In response to receiving the keyword string, the invitation engine 230 may cause the communication platform server 130 to generate a message to the workspace member requesting information to execute the invitation. For example, an instant messaging platform server generates an automated text in a messaging thread with the workspace user who entered the keyword string, where the automated text includes a prompt for the user to provide contact information for the person that the workspace member wishes to invite. The invitation engine 230 may also receive an invitation request from an interface of the computing server 110. For example, the invitation engine 230 may provide a GUI element for display at a webpage hosted by the computing server 110. A workspace member can interact with the GUI element to provide contact information for the person that the workspace member wishes to invite to use the services of the computing server 110.

The client profile management engine 235 user profiles (e.g., employee profiles) of clients of the computing server 110. The computing server 110 serves various clients (e.g., organizational clients) that have different associated named entities such as employees, vendors, and customers. For example, the client profile management engine 235 may store the employee hierarchy of a client to determine the administrative privilege of an employee in managing a transaction. An administrator of the client may specify that certain employees from the financial department and managers have the administrative privilege to create cards, adjust subscription plans, and manage vendors for the organization. The client profile management engine 235 assigns metadata tags to transaction data of an organization to categorize the transactions in various ways, such as by transaction types, by merchants, by date, by amount, by card, by employee owner identifier, by employee groups, etc. The client profile management engine 235 monitors the spending of various transaction with respect to different vendors.

The account management engine 240 creates and manages accounts including payment accounts such as credit cards that are issued by the computing server 110. An account is associated with a named entity such as an employee and may correspond to a card such as a credit card, a prepaid card, etc. A client may use the computing server 110 to issue domain-specific payment accounts such as company cards. The client enters account information such as the cardholder's name, role and job title of the cardholder in the client's organization, limits of the card, and transaction rules associated with the card. In response, the account management engine 240 creates the card serial number, credentials, a unique card identifier, and other information needed for the generation of a payment account and corresponding card. The account management engine 240 associates the information with the cardholder's identifier. The computing server 110 communicates with a credit card company (e.g., VISA, MASTERCARD) to associate the card account created with the identifier of the computing server 110 so that transactions related to the card will be forwarded to the computing server 110 for approval.

The account rule management engine 245 manages rules and restriction of cards and payment accounts created by the computing server 110. The cards and payment accounts may be associated with one or more transaction rules that are specified by the client's administrator or the card holder. Rules may be associated with pre-authorization and restrictions on certain transactions. Rules can be based on transaction categories, merchant categories, specific merchants, time limits, date limits, amount limits, and/or other suitable criteria, whether the criteria are permanent or temporary, dynamic or predefined, party-specific or not. For example, an administrator, who could be a designed employee or the credit card holder, in creating or editing a card, may specify a date and time limit on the card. The date and time limit can be permanent (e.g., a card being invalid after a certain time and date), periodic (e.g., a card being invalid during weekend and holidays), temporary (e.g., a card being invalid between two dates), and dynamic (e.g., a card being valid or invalid based on other triggering conditions). The administrator may also specify a transaction amount limit for each transaction. The transaction amount limit is different from the card limit. The card limit specifies the total amount that a card holder can spend for a period of time (e.g., monthly limit). The administrator may further specify a transaction amount limit for the maximum amount of spending for each transaction. In some cases, the limit of a card may also be aggregated toward a total limit of the organization. The administrator may specify various limits using a portal provided by the computing server 110. The administrator may also specify transaction category, merchant category, and specific merchants that are pre-approved or blacklisted for a specific card. The computing server 110 may impose a merchant-specific restriction on a card. For example, an administrator of a client may specify that a specific card can only be used with a specific merchant. The account management engine 240 stores various rules associated with each card as part of variables associated with the card.

While in this disclosure various examples of account creation process through a communication platform are discussed, in some embodiments a user may also adjust the rules managed by the account rule management engine 245 after an account is created through the communication platform using specific keyword and in-app prompts in the communication platform similar to an account creation process.

The named entity identification engine 250 identifies specific named entities associated with various transactions. For a given transaction of an organizational client, there can be two or more different types of named entities involved in the transaction. For example, the transaction may be associated with a third party such as a customer or a vendor. In addition, an organization employee may be the person who caused the transaction and is responsible for the transaction. In some cases, the employee may be referred to as the owner of the transaction. The named entity identification engine 250 identifies various types of named entities in the transactions of a client.

With respect to the identification of vendors that conduct businesses with the organization client, the named entity identification engine 250 may identify merchants that are associated with the transactions. The named entity identification engine 250 may apply a model to determine the merchant that is associated with a particular transaction. The model may be a machine learning model or an algorithmic model that includes a set of rules to determine the merchant.

For example, the named entity identification engine 250 parses transaction data from different clients to identify patterns in the transaction data specific to certain merchants to determine whether a transaction belongs to a merchant. In a card purchase, the transaction data includes merchant identifiers (MID), merchant category code (MCC), and the merchant name. However, those items are often insufficient to identify the actual merchant of a transaction. The MID is often an identifier that does not uniquely correspond to a merchant. In some cases, the MID is used by the POS payment terminal company such that multiple real-world merchants share the same MID. In other cases, a merchant (e.g., a retail chain) is associated with many MIDs with each branch or even each registry inside a branch having its own MID. The merchant name also suffers the same defeats as the MID. The merchant name may also include different abbreviations of the actual merchant name and sometimes misspelling. The string of the merchant name may include random numbers and random strings that are not related to the actual real-world name of the merchant. The named entity identification engine 250 applies various algorithms and machine learning models to determine the actual merchant from the transaction data. The named entity identification engine 250 may search for patterns in transaction data associated with a particular merchant to determine whether a transaction belongs to the merchant. For example, a merchant may routinely insert a code in the merchant name or a store number in the merchant name. The named entity identification engine 250 identifies those patterns to parse the actual merchant name. Examples of how a merchant is identified are discussed in further detail in association with FIG. 4. U.S. patent application Ser. No. 17/351,120, entitled real-time named entity based transaction approval, filed on Jun. 17, 2021, is incorporated by reference herein for all purposes.

The named entity identification engine 250 may also identify the employee owner with respect to a transaction as well as a vendor. The named entity identification engine 250 may suitable any suitable methods to identify the employee owner. For example, the named entity identification engine 250 may apply a model to determine the employee who should be responsible for a particular transaction or a particular vendor. The model may be a machine learning model or an algorithmic model that includes a set of rules to determine the employee owner. In some cases, with respect to a particular transaction, the model may include a rule determining that the employee who incurred the expense associated with transaction or who caused the transaction is the owner. In some cases, the model may include a rule determining that the employee who uploaded the invoice or record associated with the transaction is the owner. With respect to a vendor, the named entity identification engine 250 may also assign a "owner," who is an employee that is primarily responsible for managing the transactions associated with the vendor. In some cases, the model may include a rule determining that the employee who spent the most with the vendor is the owner. In other cases, the model may include a rule determining that the employee who has the highest spending recently or within a specific time period is the owner. The model may also be a machine learning model that predict the owner of a transaction or associated with a vendor. The owner automatically determined by the named entity identification engine 250 may also be manually adjusted by the client administrator.

The payment accounts operated by computing server 110 may be adjusted based on merchant level restriction and employee level restriction. In some embodiments, those restrictions may also be imposed through the portal provided by the computing server 110 or at a communication platform using keyword and in-app prompts.

The interface 255 enables the computing server 110 to communicate with different parties and servers. For example, the interface 255 enables the computing server 110 to process data received from the client device 120 (e.g., over the network 140). The interface 255 may take the form of a SaaS platform that provides clients with access to various functionalities provided by the computing server 110. The interface 255 provides a portal in the form of a GUI for clients to apply for accounts, manage account requests, specify account settings (e.g., rules of a credit card), approve account requests, and send invitations. An example of a GUI element of the interface 255 is shown in FIG. 7. The interface 255 is in communication with the application 122 and provides data to render an account creation request portal in the application 122.

In one embodiment, the interface 255 also includes an API for clients of the computing server 110 to communicate with the computing server 110 through machines. The API allows the clients to retrieve the computing server 110 stored in the data store 115, send query requests, and make settings through a programming language. Various functionalities of the engines 205 through 230, such as the approval rules for processing an account creation request, may be changed by the clients through sending commands to the API. The API allows the clients to automate various processes such as card approvals. For example, a client may receive a workspace member's request for a credit card account and dynamically adjust, using code instructions specified by the client, the approval rules of the approval rules management engine 210 to automatically approve requests for credit cards made for a specific purpose (e.g., utility payment). In another example, a client may integrate its own data and dynamically adjust the approval rules of account requests. For instance, the client may provide a workspace member's credentials to override a default amount limit on a certain type of credit card being requested. The data may be provided to the computing server 110 to dynamically adjust the credit limit on the card issued to the workspace member.

The computing server 110 may synchronize the data maintained by the computing server 110 with servers communicatively coupled to the computing server 110. Examples of data that can be synchronized include the account creation request approval rules, pending and completed account creation requests, transactions made by created accounts, the accounts themselves and corresponding account rules. The computing server 110 may enable this synchronization by generating a unique identifier for objects such as account creation requests, accounts, rules, or any other object that is to be made accessible across multiple server interfaces. The unique identifiers can be used to track where at the respective interfaces the information associated with the object is displayed, and edit the information displayed. This may be an alternative to generating a new display element containing updates to the object, which may require extra storage space to maintain the new display element. For example, the computing server 110 edits an existing text message for an account creation request that the server 110 caused to be generated within a messaging thread at the computing platform server 130. The computing server 110 locates the existing text message through a unique identifier associated with the account creation request and provided to the communication platform server 130 when the text message was created. The edit to the existing text message shows an update to an account creation request that was previously submitted (e.g., a credit limit was decreased). By editing an existing message rather than create a new one, the computing server 110 has saved the storage space that might otherwise have been needed to store a new text message with the update.

Figure 8:
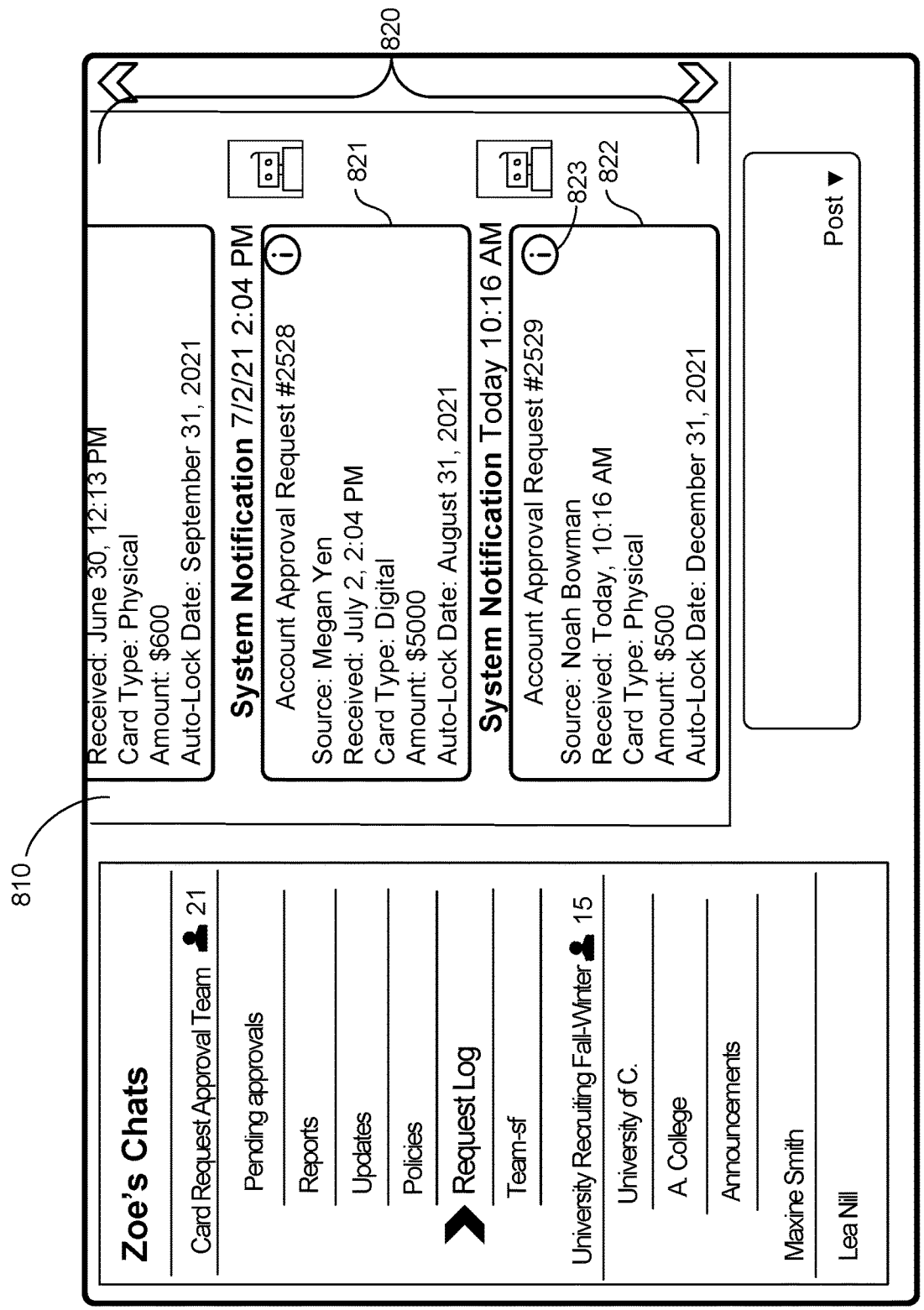
FIG. 8 illustrates an account creation log within a messaging thread on a communication platform server interface, in accordance with an embodiment.

In another example, the communication platform server 130 may display a log of account creation requests submit to the computing server 110 through either an interface hosted by the computing server 110 or an interface hosted by the communication platform server 130 (as shown in FIGS. 7-8). The displayed requests can be synchronized in substantially real time by the computing server 110 using unique identifiers assigned to each of the requests. In addition to the synchronized display of requests received at the computing server 110, edits or approval decisions related to the account creation requests received at either interface can be synchronized across both interfaces in substantially real time (e.g., within a second of the computing server 110 receiving the edit or approval decision). The computing server 110 can use unique identifiers for each request to update the existing entries in the log of account creation requests rather than create new entries for edited requests, approved requests, or denied requests.

In some embodiments, the communication platform server 130 may generate a unique identifier for the objects (e.g., account creation requests, rules, transactions) the server 130 receives from the computing server 110 and displays at an interface hosted by the server 130. The unique identifier generated by the communication platform server 130 may be in addition to or as an alternative to the unique identifier generated by the computing server 110. In yet another example of synchronization across servers, the computing server 110 maintains a list of transactions made by a workspace member with the member's created account (e.g., a credit card account) and information about the transactions (e.g., the amount of the transaction). This list of transactions may be displayed within a messaging thread as a log of the workspace member's transactions (e.g., for monitoring by an accounting department), where the messaging thread is managed by the communication platform server 130. Each entry of the log is associated with a first unique identifier, generated by the computing server 110 for the transaction, and with a second unique identifier, generated by the communication platform server 130 for the text message in the messaging thread that acts as a log entry. The computing server 110 may receive the second unique identifier from the communication platform server 130 and store it in a database with an association to the first unique identifier so that the computing server 110 can provide the second unique identifier to the communication platform server 130 to access the text message. If in addition to the original transaction cost, the workspace member had included a tip to be charged to the credit card account, the computing server 110 may query for the second unique identifier using the first unique identifier, provide the communication platform server 130 with the second unique identifier, and cause the communication platform server 130 to update the amount in the existing messaging thread text message with the tip. The communication platform server 130 may then cause the display of the existing text message in the transaction log to change and reflect the updated transaction amount. As demonstrated by the foregoing examples, an advantage provided by the computing server 110 is enabling a workspace member the flexibility to access up-to-date data from the computing server 110 at the communication platform server 130.

The components of the communication platform server 130 function to provide communication services for workspace members of an organization and interact with other parties and servers. The communication platform server 130 can generate a GUI for display at the client device 120. For example, the communication platform server 130 generates a GUI for communicating through the application 122. The GUI can be used to send instant messages, email, SMS, images, video, or any other suitable media for communicating data. The communication platform server 130 may be a SaaS platform that serves multiple organizations, tracking inter-organizational or intra-organizational communication between workspace members. The communication platform server 130 may create user tokens to facilitate this tracking (e.g., using the user token engine 265). The communication platform server 130 uses the interface 270 to enable clients to access the functionalities of the communication platform server 130.

The messaging engine 260 establishes a medium for one or more parties to communicate with each other using respective devices through a communication network (e.g., the network 140). Examples of communication mediums include instant messaging (IM), social media, text messaging (e.g., SMS), email, electronic mailing lists, internet forums, or any suitable text-based computer-facilitated communication. For example, the messaging engine 260 facilitates instant messaging among clients of the communication platform server 130. The messaging engine 260 maintains various messaging threads, each thread a conversation between one or more clients. The participants in a messaging thread can be customized by the clients. For example, a client can create a messaging thread with participants designated as request approvers for account creation requests. An example of a messaging thread among request approvers is shown in FIG. 6. In some embodiments, the messaging engine 260 may enable a party to communicate with themselves. For example, a workspace member may send emails or instant messages to themselves. The messaging engine 260 monitors strings in thread to look for special keywords that are used by the users to launch various in-app functionalities. The messaging engine 260 may also assign a unique message identifier to each message and provides an API for a party (e.g., computing server 110) to make an API to retrieve message history using the message identifiers for messages to which the computing server 110 has access privilege.

The user token engine 265 generates user token to identify workspace members using the computing server 110 through the communication platform server 130. The user token may be any alphanumeric string to identify a workspace member or an attribute associated with the member such as the organization of which they are a member, an application used on the communication platform server, or any suitable descriptive attribute of the member. For example, the user identification engine 205 prompts the instant messaging application to provide a user token "u192005.cards" identifying a workspace member by an identification number "192005" and an association with the application "cards" used by the member in the communication platform server. The user token can include an email domain of the workspace member's organization. For example, the user token can be "jsmith@example.net," identifying the email domain of "example."

The interface 270 enables the communication platform server 130 to communicate with different parties and servers. For example, the interface 270 enables the communication platform server 130 to process data received from the client device 120 (e.g., over the network 140). The interface 270 may take the form of a SaaS platform that provides clients with access to various functionalities provided by the communication platform server 130. The interface 270 provides GUI elements for clients to hold conversations with other clients of the communication platform server 130. Examples of GUI element of the interface 270 is shown in FIGS. 5-6. The interface 270 is in communication with the application 122 and provides data to render an account creation request portal in the application 122. In one embodiment, the interface 270 also includes an API for clients of the communication platform server 130 to communicate with the communication platform server 130 through machines. The API allows the clients to retrieve the communication platform server 130 (e.g., stored in the communication platform server data store 135), send query requests, and make settings through a programming language. The interface 270 also includes a webhook functionality to send information payload to another server without waiting for the other server to make an API call.

While the computing server 110 and the communication platform server 130 are illustrated as separate servers, in one embodiment, the communication platform server 130 may be part of the computing server 110. For example, in one embodiment, the computing server 110 may generate an application for an account creation request within a messaging thread (i.e., the messaging thread also generated by the computing server 110) instead of setting up a separate server to perform the functions of the communication platform server 130.

Initiating and Processing Account Creation Requests

Figure 3:
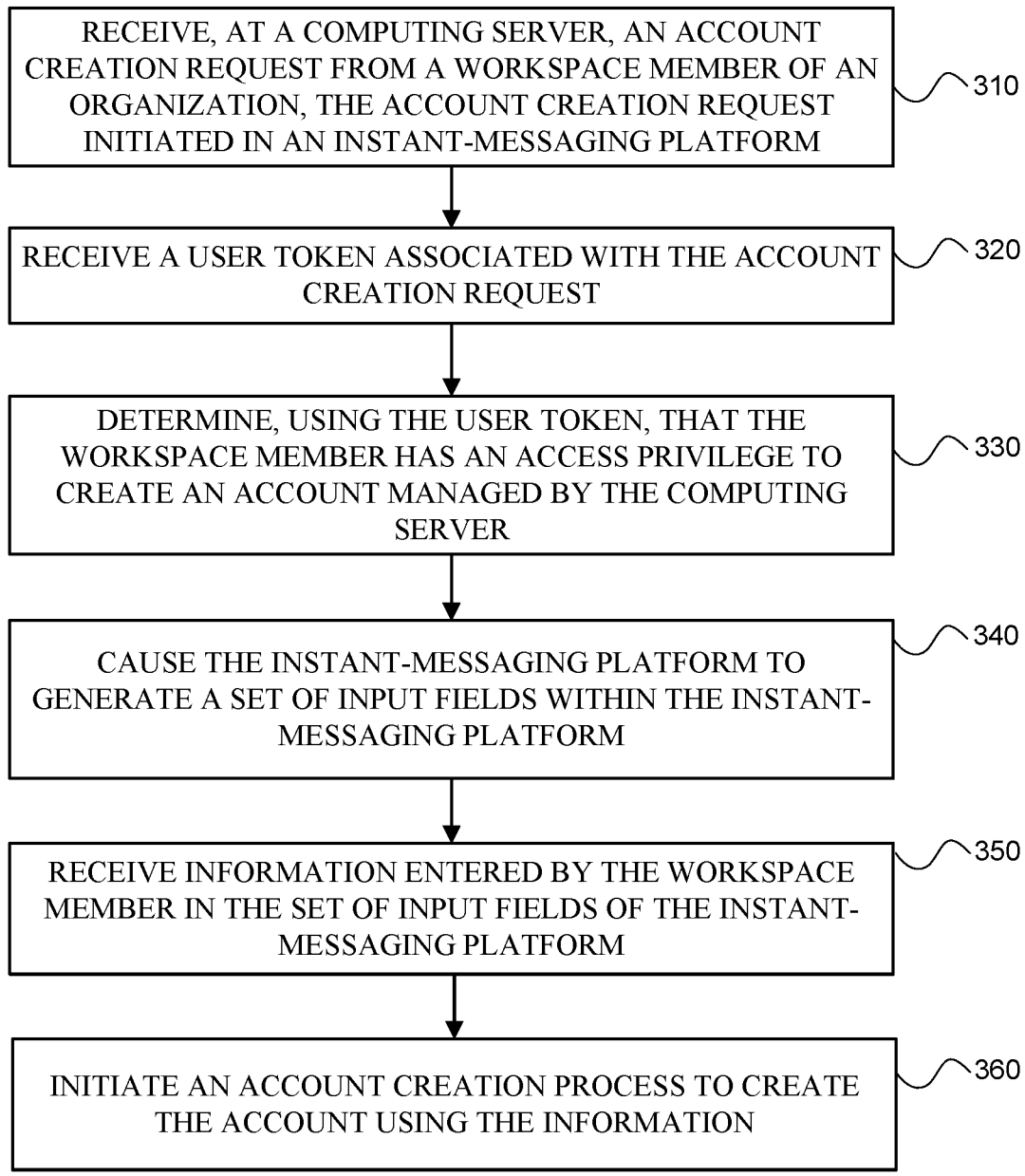
FIG. 3 is a flowchart depicting a computer-implemented process for initiating an account creation process using both a computing server and a communication platform server, in accordance with an embodiment.

FIG. 3 is a flowchart depicting a computer-implemented process 300 for initiating an account creation process using both a computing server 110 and a communication platform server 130, in accordance with an embodiment. For the particular embodiment discussed in FIG. 3, the computing server 110 and the communication platform server 130 are different servers and operate independently. As referred to herein, "independently operating" may describe servers whose individual operations and resources are not dependent upon the operations and resources of others (e.g., no shared processing, memory, or power resources). For example, the computing server 110 includes one or more computers. A computer associated with the computing server 110 includes a first processor and first memory. The first memory stores a set of code instructions that, when executed by the first processor, causes the first processor to perform some of the steps described in the process 300. The communication platform server 130 uses different hardware and includes a different computer (or one or more computers) that includes a second processor and second memory. The communication platform server 130 is an instant messaging platform in the process 300. The set of code instructions also include instructions that, when executed by the first processor, cause the second processor to perform steps. While two independent servers are described as an example architecture associated with the process 300, in some embodiments a single server can also perform the entire process 300.

The computing server 110 receives 310 an account creation request from a workspace member of an organization, the account creation request initiated in an instant messaging platform. In some embodiments, the account creation request can be initiated through a keyword string. For example, a workspace member can enter the string "/app_name cards new" into a messaging thread in an instant messaging platform that recognizes predefined commands (e.g., as specified by an API). In another example, a workspace member can enter a string in the form of a natural language command like "I'd like to create a card" into an SMS messaging platform server, which may include an interface for communicating with the computing server 110. The account creation request can be initiated responsive to a selection of a GUI element. For example, the workspace member selects a button displayed on an instant messaging GUI that triggers the computing server 110 to determine whether the workspace member has access privileges to create an account. The account creation request can be a bulk creation request to create multiple accounts on behalf of one or more workspace members. For example, a workspace member may submit credit card creation requests for each member in a team preparing for business trips. The computing server 110 and the communication platform server 130 may pre-establish a webhook channel. Responsive to detecting the request initiated by workspace member, the communication platform server 130 may provide a webhook payload to the computing server 110 indicating an account creation request is initiated. The computing server 110 receives the account creation request through the webhook payload. By requesting an account to be created through a communication platform server that is not the computing server, workspace members may be allowed the flexibility to access the computing server's functionality without logging into (e.g., providing login credentials) the computing server 110.

While an account creation request is used as an example, one or more steps in the process 300 may also be used for account adjustment requests such as requests that impose rules and restrictions on a credit card account after the account is created. Various rules and restrictions are discussed in FIG. 2 in association with the account rule management engine 245 and the named entity identification engine 250. For example, a user may use the strings "/app_name restrict spend" and "/app_name restrict merchant" to respectively adjust the spending limit and impose a merchant level restriction on the payment account.

The computing server 110 receives 320 a user token associated with the account creation request. For example, the user token may be included in the webhook payload. The user token may include an identifier (e.g., keyword or ID no.) that enables the computing server 110 to determine a feature of a workspace member's identity that indicates access privilege for creating an account. The user token may identify a workspace member who is requesting account creation requests in bulk, where the user token indicates whether the source (i.e., the workspace member requesting on behalf of others) has privileges to access the account creation function of the computing server 110 or whether each of the workspace members for which the request is being made has access privileges. The identifier in the user token may be a string including the workspace member's name, organization's name, or an email address. The identifier may be generated by the instant messaging platform and provided to the computing server 110 when the workspace member is using the services of the computing server 110 in the instant messaging platform. For example, an instant messaging platform generates a user token for its members who download an application to use functions of the computing server 110 through the interface of the instant messaging platform, where the user token identifies an email address provided by the workspace member to the instant messaging platform. The email address may indicate that the workspace member has an account with the computing server 110 (e.g., the email domain names are identical).

In some embodiments, the computing server receives 320 a user token that is a unique identifier provided, by the instant messaging platform, to the computing server 110 upon creation. For example, an instant messaging platform tokenizes sensitive information of a workspace user such as their name, email address, and date of birth and concatenates them into a unique identifier to be used as the user token. The instant messaging platform may send information of the workspace member who has downloaded an application for using functions of the computing server 110 on the instant messaging platform along with the member's user token, where the information indicates whether the member has access privileges. For example, an organization administrator may specific what level of employees or which specific employees can have the privilege to create cards. The computing server 110 may store the member's information in a data structure (e.g., an account profile) for lookup using the member's user token.

The computing server 110 determines 330, using the user token, that the workspace member has an access privilege to create an account managed by the computing server. The computing server 110 may determine that a workspace member has access privileges if the member has an account with the computing server 110. In some embodiments, the computing server 110 may access an account profile on the computing server 110 of the workspace member, where the account profile indicates whether the account has access privileges. For example, the computing server 110 receives a user token generated by an instant messaging platform along with information of the workspace member associated with the generated user token. The information includes the workspace member's email address used to access the instant messaging service. The information is stored in an account profile by the computing server 110. When the workspace member requests an account within the instant messaging platform, the instant messaging platform can provide the user token to the computing server 110. The computing server 110 can access the stored information using the user token as a lookup key and determine that the domain name in the workspace member's email address is not the domain name used by the computing server 110. In response, the computing server 110 may cause the instant messaging platform to generate a notification to the workspace member within an interface of the instant messaging platform informing the workspace member that they do not have access privileges to request account creation. Alternatively, the computing server 110 determines that the domain name in the workspace member's email address matches the domain name of the computing server 110 and proceeds to cause 340 the instant messaging platform to generate a set of input fields within the instant messaging platform.

In some embodiments, the account to be created is also creatable through a first set of input fields in an application operated by the computing server 110. For example, the computing server 110 may separately provide a SaaS platform for users to log in for card account management. While the account to be created may be created through the instant-messaging platform, the account may also be created at the SaaS platform. The SaaS platform provides the first set of input fields that allow a user to input information for the payment card to create the account.

The computing server 110 causes 340 the instant messaging platform to generate a set of input fields within the instant messaging platform. For example, the computing server 110 may send an API call to command the instant messaging platform to create a prompt that include in the input fields. The input fields may be included in the API call or may be coded in the in-app application of the computing server 110. The computing server 110 causes the instant messaging platform to provide an account creation application that contains a set of input fields to enter information for creating the account. The input fields can include account creation settings such as account name, type, resource limits, workspace members authorized to use the account, or any suitable account setting. The input fields can be generated as a GUI element displayed within the instant messaging platform. For example, the computing server 110 causes the instant messaging platform to generate a pop-up with input fields of name, type, amount, frequency, and auto-lock date for creating a credit card.

The set of input fields within the instant messaging platform may be referred to as a second set of input fields. In some embodiments, the second set of input fields is the same as the first set of input fields provided by the application directly operated by the computing server 110. For example, the same input form for creation of a payment account can appear at a SaaS platform provided by the computing server 110 or the instant-messaging platform, depending on the user's choice of where to create the payment account. In some embodiments, the second set of input fields are similar to the first set but may have different forms of presentations, depending on the graphical elements available in the instant-messaging platform. In some embodiments, at least one of the input fields in the second set corresponds to at least one of the input fields in the first set.

In some embodiments, the input fields can be a single input field used for each account creation setting. For example, the instant messaging platform uses a messaging thread between the user and an automated assistant that uses natural language to prompt the workspace member for account creation settings. The automated assistant may enter, in the messaging thread, questions such as "What would you like to name your credit card?" and the workspace member may specify a requested credit card name in a message input box, typing and sending a name such as "University Recruiting." The automated assistant may then proceed to prompt the user for additional fields and notify the user when the provided field is invalid. For example, "Sorry, the requested limit for your credit account is not accepted. The maximum is $5000. Please contact finance@example.com for further assistance." Although not depicted, the computing server 110 may include a natural language engine to enable an automated assistant to facilitate account creation requests. In some embodiments, a generated input field may prompt the user for an existing account name such that the new account created will have the same settings as the existing account. For example, a workspace member may specify the name of an existing credit card through the input fields and the computing server 110 determines, in response to this input, that the user is requesting to create a credit card with account creation settings identical to the existing credit card.

In some embodiments, the computing server 110 generates a set of input fields within an interface of the computing server 110 that may include some or all fields generated at the instant messaging platform. For example, the computer server 110 may host a website where a workspace member may request a credit card in addition to providing an API for the workspace member to request the credit card through an instant messaging platform. The computing server 110 may generate similar input fields such as credit card name, credit limit, and payment frequency on both a portal in the instant messaging platform (e.g., the example portal in FIG. 5) and a website webpage. In this way, the computing platform 110 provides flexibility to a workspace user to request an account through various platform interfaces rather than being limited to the platform interface hosted by the computing server 110.

The computing server 110 receives 350 information entered by the workspace member in the set of input fields of the instant messaging platform. The returned information may be carried as a response of the API call or as another webhook payload. The instant messaging platform may receive the account creation settings that the workspace member specifies in the set of input fields and provide the received account creation settings to the computing server 110. For example, the instant messaging platform may receive member-specified account settings in the set of input fields from the user via the interface 124 on the client device 120. The instant messaging platform may then communicate the account creation settings using an API and the network 140. In one example, the computing server 110 receives 350 information indicating that the member is requesting a digital credit card with a limit of $500 and an account close date at the end of the month.

The computing server 110 initiates 360 an account creation process to create the account using the information. The computing server 110 may use the information received in the account creation request and the set of input fields to determine how the account creation should be processed. The processing may include applying one or more rules such as receiving approval from a list of request approvers. The account creation process may occur across various platforms, facilitated by the computing server 110. For example, the computing server 110 may generate a request for a first request approver at a website hosted by the computing server 110 and cause the instant messaging platform to generate a request for a second request approver within a messaging thread involving the second request approver.

Figure 4:
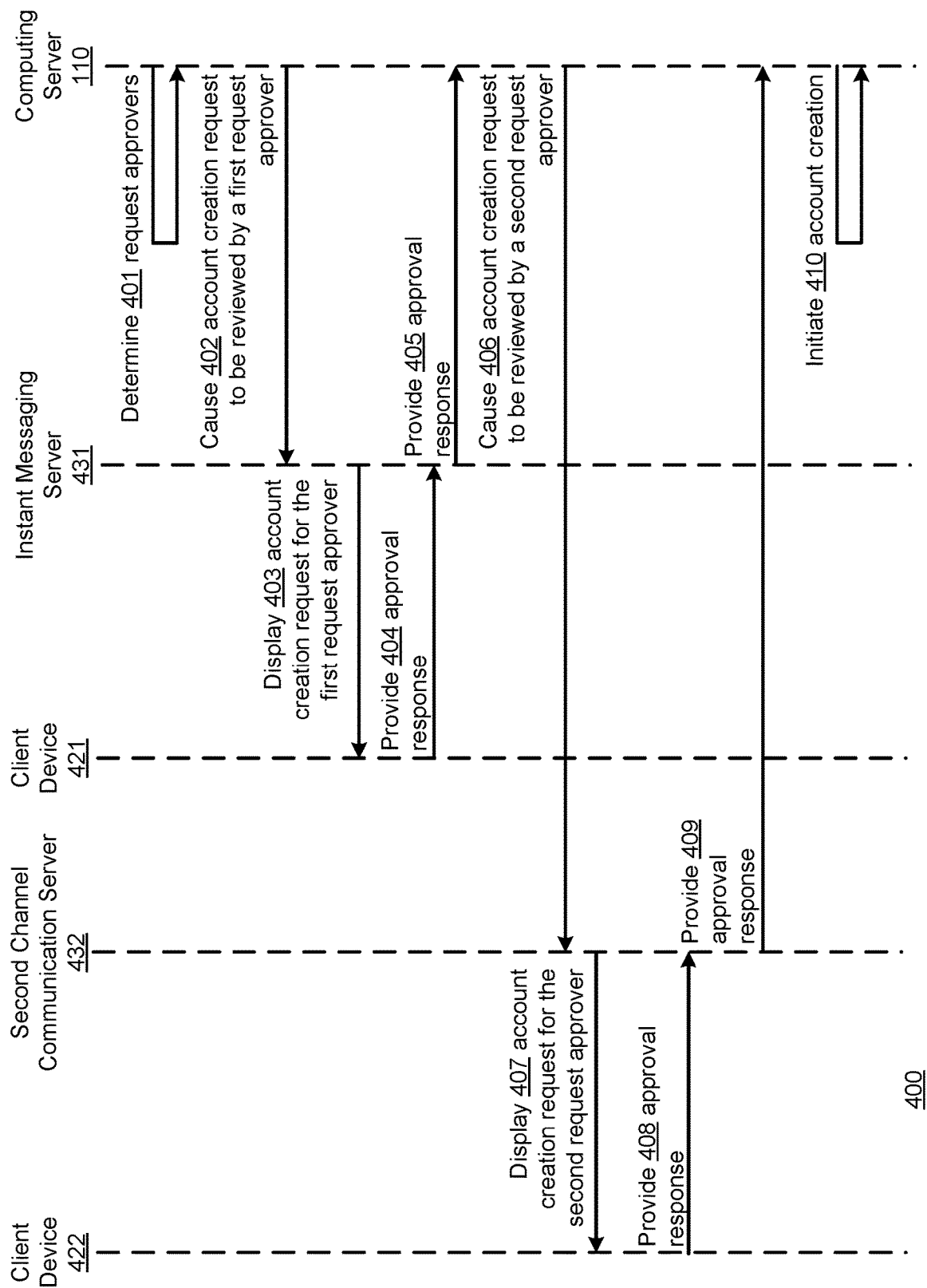
FIG. 4 is an interaction diagram depicting a computer-implemented process for processing an account creation request, in accordance with an embodiment.

FIG. 4 is an interaction diagram 400 depicting a computer-implemented process for processing an account creation request, in accordance with an embodiment. The process is performed by client devices 421 and 422, a second channel communication server 432, an instant messaging server 431, and a computing server 110. These components are communicatively coupled over a network (e.g., the network 140 of FIG. 1). The instant messaging server 431 and the second channel communication server 432 are examples of communication platform servers as described in the description of FIG. 2. The second channel may be a channel different from the instant messaging channel. For example, the second channel can be email, SMS, in-app notification, push notification, a phone call, etc. There may additional, fewer, or different interactions between the interacting components of FIG. 4. For example, the client devices 421 and 422 of request approvers may communicate with a communication platform server to edit an approval request before providing an approval response. The interactions of the diagram 400 may occur after the process 300 of FIG. 3 occurs, where the computing server 110 has determined that a workspace member has access privileges to initiate an account creation request and received information for the account creation settings.

To process an account creation request, a computing server 110 determines 401 one or more request approvers. As shown in FIG. 4, the computing server 110 determines two request approvers, each having their own client devices 421 and 422. In some embodiments, the computing server 110 determines request approvers based on an account creation approval log. The approval log can include a list of completed requests, the approvers who reviewed the request, their decisions, the communication platform server used to reach them, and the amount of time taken between sending an initial request for their review and receiving the approval response. The computing server 110 can track each account creation request that the server 110 sends out for review by an approver and add to the approval log. Using the times tracked in the approval log, the computing server 110 can determine each reviewer's timeliness of making a decision regarding the account creation. The request management engine 215 of the computing server 110 may maintain the approval log of completed requests and track the status of pending requests. The request processing engine 225 of the computing server 110 can use the information maintained by the request management engine 215 to determine 401 a subset of the request approvers to send a request to for review. For example, the request processing engine 225 determines to contact a first and second request approver based on a combination of the pending requests assigned to each available approver and the response timeliness of each available approver. That is, the request processing engine 225 can rank approvers according to their timeliness and select the two fastest approvers whose number of pending requests does not exceed a threshold limit (e.g., ten requests to review).

The computing server 110 causes 402 an account creation request to be reviewed by a first request approver of the determined 401 request approvers. The computing server 110 may use the approval log to determine which communication platform server the determined 401 request approvers use to provide an approval decision. The computing server 110 may determine that the first request approver uses an instant messaging server 431 for a majority of their approval decisions or for over a threshold percentage of their approval decisions. In response, the computing server 110 may cause 402 the account creation request to be reviewed by the first request approver by causing the instant messaging server 431 to display 403 the account creation request for the first request approver's review. For example, the computing server 110 may access the instant messaging platform's functions through an API and cause a message to be displayed in a messaging thread for the first request approver.

The instant messaging server 431 displays 403 the account creation request for the first request approver. The instant messaging server 431 is an example of a communication platform server 130 that includes a messaging engine to communicate the account creation request to the first request approver. For example, the instant messaging server 431 may generate for display a messaging thread on a GUI on the client device 421. The first request approver may interact with the messaging thread to provide 404 an approval response or request that the account creation request (e.g., settings of the account specified by a workspace member) are edited before approval is given.

The client device 421 provides 404 an approval response to the instant messaging server 431. The approval response may include a decision to approve or deny the account creation request. The approval response may include edits to the account creation settings. For example, the approval response includes an edit to the workspace member's requested credit card auto-lock date, approving the response under the condition that the requesting workspace member accepts the first request approver's edits. The response may be provided through an interface between the client device 421 and the instant messaging server 431 such as an internet browser or instant messaging application. The instant messaging server 431 provides 405 the approval response to the computing server 110. In one example, the instant messaging server 431 uses an API of the computing server 110 to communicate the first request approver's response.

The computing server 110 may repeat a similar process for a second request approver using the client device 422 and the second channel communication server 432. The computing server 110 causes 406 the account creation request to be reviewed by the second request approver by causing the second channel communication server 432 to display 407 an account creation request for the second request approver's review. For example, the client device 422 is a smartphone and the second request approver receives an SMS with information of the account creation request (e.g., the member-specified account creation settings). The second request approver can then provide 408 an approval response. For example, the second request approver uses an interface of the client device 422 (e.g., a touchscreen of the smartphone) to provide 408 a text having the keyword "approved" or "denied." The second channel communication server 432 provides 409 the approval response to the computing server 110.

In some embodiments, the computing server 110 may determine that a request approver is unresponsive over one communication platform server and use an alternative communication platform server to reach the request approver. For example, the second request approver has not provided 408 an approval response after a threshold amount of time (e.g., one week) since the computing server 110 causes 406 the account creation request to be reviewed by the second request approver. The computing server 110 tracks this time elapsed (e.g., using the request management engine 215) and determines that another communication platform server through which the second request approver is most likely to respond is the instant messaging server 431. The computing server 110 may then perform interactions similar to those performed for the first request approver to receive an approval response from the second request approver.

The computing server 110 initiates 410 an account creation process after receiving the approval responses provided by the first and second request approvers. The computing server 110 may use the account creation settings provided by the user (e.g., the received 350 information described in FIG. 3) or settings edited by the request approvers to initiate the account creation process. For example, the computing server 110 provides the settings to a credit card company to create an account for the workspace member. In some embodiments, the computing server 110 performs the account creation. For example, a bank uses the computing server 110 to maintain credit card accounts, facilitate transactions, and initiate and process credit card creation for their clients.

Account Creation Interfaces

FIGS. 5-8 are diagrams illustrating example graphical user interfaces for creating, approving, and managing account creation requests, in accordance with at least one embodiment. The GUIs shown in FIGS. 5 and 6 may be interfaces provided by the communication platform server 130 (e.g., an instant messaging platform server). The GUIs shown in FIGS. 7-8 depict summary logs of account requests generated on interfaces that can be provided by the computing server 110 and the communication platform server 130, respectively. The interfaces shown in FIGS. 7-8 may provide similar information provided in their respective interfaces due to a synchronization of data between the computing server 110 and the communication platform server 130. The diagrams illustrate various contexts in which a workspace member's account creation request may be depicted.

FIG. 5 illustrates an account creation request portal 510 on a communication platform server interface 500, in accordance with an embodiment. In the example depicted, a workspace member, Noah Bowman, requests a new credit card for expenses made during an upcoming conference for members of an Innovation Program. The workspace member uses an instant messaging platform to communicate with members of the Innovation Program, where the instant messaging platform and the computing server 110 use APIs to interact with one another. Examples of interactions are described with reference to FIGS. 3-4. Prior to the account creation request portal 510 being generated over the workspace member's messaging thread, the workspace member may have entered a keyword string to trigger the generation (e.g., "/app_name cards new"). The account creation request portal 510 includes a set of fields specifying the account settings for the credit card. Specifically, the set of fields include a card name, card type, amount, frequency, and auto-lock date. The computing server 110 may cause the instant messaging platform to display the account creation request portal 510 with the set of fields. Additionally, the computing server 110 may cause an interface (e.g., a website) maintained at the computing server 110 to display a GUI with a form having the same or a similar set of fields. In some embodiments, through the portal 510, the workspace member can access the functionality of the computing server 110 without providing login credentials to access the workspace member's account with the computing server.

FIG. 6 illustrates a request approver messaging thread 610 on a communication platform server interface 600, in accordance with an embodiment. Following the context established in the example described in FIG. 5, FIG. 6 shows the workspace member's credit card creation request provided to the computing server 110, which then determines request approvers to process the workspace member's request. In the example depicted in FIG. 6, the computing server 110 determines to send the workspace member's request to a messaging thread 610 maintained by an instant messaging platform, which may be the same platform that the workspace member was using or a different instant messaging platform (e.g., different communication platform servers may communicate with the computing server 110 through respective API's). The messaging thread 610 may be designated for request approvers of the workspace member's organization. The workspace member's request appears in the messaging thread 610 as a notification 620 to review the account creation request. The notification 620 may be formatted as a message sent within the messaging thread 610, as depicted in FIG. 6, a pop up overlaying the messaging thread 610, an entry in a table of requests, where the table is generated for display adjacent to the messaging thread by the instant messaging platform.

FIG. 7 illustrates an account creation management interface 700, in accordance with an embodiment. Following the context of the example described in FIGS. 5-6, FIG. 7 shows the workspace member's account creation request displayed at a webpage that the computing server 110 can cause to be generated on a web browser. The account creation request is shown in an account creation request log 710 as entry 711 alongside requests submit earlier such as an entry 712 submit by another workspace member. The interface 700 may be accessible by the request approvers also receiving the requests for review at the messaging thread 610 of FIG. 6. The data within the log 710 shown in interface 700 may be maintained by the request management engine 215 of the computing server 110. The computing server generates the log to be interactive through filtering and search features that increases the accessibility of the requests. For example, the computing server 110 may provide a column in the log for the status of the request, and approvers can filter the requests to only show prioritized credit card creation requests. The computing server 110 may cause the instant messaging platform shown in FIGS. 5-6 to generate a similar log (e.g., a summary of the requests or a messaging thread's chat history that contains the credit card creation requests). An example of this is depicted in FIG. 8.

FIG. 8 illustrates an account creation request log 820 within a messaging thread 810 generated on a communication platform server interface 800, in accordance with an embodiment. Following the context of the example described in FIGS. 5-7, FIG. 8 shows the workspace member's account creation request displayed at a webpage generated by the computing server 110. The communication platform server 130 may cause the interface 800 to be generated on a display of a client device. The account creation request log 820 contains a record of account creation requests submit to the computing server 110. The communication platform server 130 is communicatively coupled to the computing server 110, which enables the data received by the computing server 110 (e.g., account creation requests) to be provided to the communication platform server 130 for synchronization. One example of synchronization is that the data of the account creation request log 820 is accessible through both the interface 700 provided for display on, for example, a website hosted by the computing server 110 and through the interface 800 provided for display on, for example, a website hosted by the communication platform server 130. Account creation request entries 821 and 822 of the log 820 correspond to the account creation request entries 711 and 712 of the account creation log 710. The accounts may be created directly at the SaaS platform provided by the computing server 110 or at the communication platform. Hence, the log 820 may include a comprehensive list of account creation activities associated with a client. In some embodiments, even if some of the accounts are solely created at the computing server 110 without the involvement of the communication platform, the log 820 may still include information on the creation of those accounts.

While an account creation request log is used as an example, in various embodiments there can be other forms of record logs such as account activity logs that document restrictions and rules that are created by the account holders. Those activities of various account holders may be collected in a single workspace and be presented to the organization client's administrator to monitor the activities of various payment accounts. For example, the log, in one entry, may display that an employee A has imposed a payment limit on a specific card. In another entry, the log may display that an employee B has set a merchant level restriction on his own card through the communication platform.

In some embodiments, the log 820 may also be part of a group chat thread. In other words, the log generator may be one of the members in the group chat thread. Other members (e.g., different administrators from the client's accounting department) may provide comments and discussions in the chat.

The computing server 110 enables synchronization between two interfaces of servers that operate independently of one another such as the computing server 110 and the communication platform server 130. In some embodiments, the computing server annotates data of the account creation requests to enable real time accessibility at both the server 110 and the server 130. The request management engine 215 may assign identifiers to each of the account creation requests and generate metadata for each of the requests, where the identifiers and metadata are accessible to the communication platform server 130 or other servers operating independently of the computing server 110. In one example, a request approver accesses the account creation request log 710 at the interface 700 and selects the entry 711 in order to edit and approve the request, changing the amount requested from $500 to $250. The request management engine 215 creates a metadata representing the approver's act of editing and annotates the entry 711, which is assigned a unique identifier such as an identification number 2528, with the metadata. The request management engine 215 may then cause the entry 822 on the log 820 in the interface 800 to be updated with the $250 amount and metadata. For example, a request approver may select a button 823 to view the metadata of the entry 822, which includes that the amount requested was edited from $500 to $250. In this way, the request management engine 215 may receive updates made at one server and perform real time synchronization of the data provided for display at another server (e.g., the interfaces 700 and 800 show the same data within one second of an update provided at one server).

ADDITIONAL CONSIDERATIONS

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Embodiments according to the invention are in particular disclosed in the attached claims directed to a method and a computer program product, wherein any feature mentioned in one claim category, e.g., method, can be claimed in another claim category, e.g., computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the disclosed embodiments but also any other combination of features from different embodiments. Various features mentioned in the different embodiments can be combined with explicit mentioning of such combination or arrangement in an example embodiment. Furthermore, any of the embodiments and features described or depicted herein can be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In one embodiment, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed by the specific order claimed or described in the disclosure. Some steps may be performed before others even though the other steps are claimed or described first in this disclosure.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A computer-implemented method, comprising:
    receiving, at a computing server, a keyword string from a workspace member of an organization, wherein the keyword string is entered by the workspace member in an instant messaging platform;
    detecting, in the keyword string, a command to create an account managed by the computing server, the command triggering a process carried out through one or more automated texts at the instant messaging platform
    receiving a user token associated with the command to create the account, the user token identifying the workspace member of the organization;
    determining, using the user token, that the workspace member has an access privilege to create an account managed by the computing server, wherein the account is creatable through a first set of input fields in a software application operated by the computing server and is creatable through a second set of fields within the instant messaging platform, wherein at least one of the input fields in the second set corresponds to at least one of the input fields in the first set, and wherein the software application is different from the instant messaging platform;
causing the instant messaging platform to generate one or more automated texts in the instant messaging platform in response to the keyword string, the one or more automated texts prompting the workspace member to enter, in the instant messaging platform, information corresponding to the second set of input fields;
receiving a set of responses to the one or more automated texts, the set of responses comprising information corresponding to the second set of input fields entered by the workspace member in the instant messaging platform; and
automatically initiating an account creation process to create the account based on the information from the set of responses to the one or more automated texts.

2. The computer-implemented method of claim 1, wherein automatically initiating the account creation process comprises:
determining a plurality of request approvers;
causing the instant messaging platform to request approval from a first of the plurality of request approvers; and
requesting, at the computing server, approval from a second of the plurality of request approvers.

3. The computer-implemented method of claim 2, wherein causing the instant messaging platform to request approval from the first request approver comprises causing the instant messaging platform to generate a third set of input fields to edit the information entered by the workspace member.

4. The computer-implemented method of claim 3, further comprising causing the instant messaging server to generate within the instant messaging platform an approval prompt to accept edits by the first request approver to the information entered by the workspace member.

5. The computer-implemented method of claim 2, wherein the plurality of request approvers are determined at the computing server.

6. The computer-implemented method of claim 2, wherein determining the plurality of request approvers comprises determining a plurality of authorized workspace members of the organization using an organizational hierarchy of the organization, the organizational hierarchy indicating one or more workspace titles having authority to approve account creation requests.

7. The computer-implemented method of claim 2, causing the instant messaging platform to request approval from the first of the plurality of request approvers comprises causing the instant messaging platform to display an approval prompt on a messaging thread designated for the plurality of request approvers.

8. The computer-implemented method of claim 2, further comprising:
causing, responsive to receiving approval for the account creation request from a plurality of request approvers of the organization, the instant messaging platform to generate an approval message within the instant messaging platform.

9. The computer-implemented method of claim 1, wherein the instant messaging platform maintains a messaging thread including a log of account creation requests.

10. The computer-implemented method of claim 9, wherein the log is a history of messages communicated within the messaging thread.

11. The computer-implemented method of claim 9, wherein the log is a summary of account creation requests.

12. The computer-implemented method of claim 1, wherein the application operated by the computing server is accessible by the instant messaging platform using an application programming interface (API).

13. The computer-implemented method of claim 12, wherein the instant messaging platform uses the API to generate an invitation to a user of the instant messaging platform to create a user account for the application operated by the computing platform.

14. The computer-implemented method of claim 1, wherein the second set of input fields are generated within a form for a credit card creation flow responsive, wherein a webhook is triggered by the instant messaging platform to receive the form from the computing server.

15. The computer-implemented method of claim 1, wherein the application operated by the computing server is one of a software as a service (SaaS) application, a mobile application, or a desktop application.

16. The computer-implemented method of claim 1, further comprising displaying within the application a list of approved account creation requests including an approved account creation request for the workspace member.

17. The computer-implemented method of claim 1, wherein determining, using the user token, that the workspace member has the access privilege comprises:
comparing an email domain of the user with an email domain of the computing server, the email domain of the user identified using the user token, the email domain of the user used to access a communication platform server; and
confirming, responsive to determining the email domain of the user matches the email domain of the computing server, that the workspace member has the access privilege.

18. A non-transitory computer readable medium configured to store computer code comprising instructions, the instructions when executed by a processor, causes the processor to:
receive a keyword string from a workspace member of an organization, wherein the keyword string is entered by the workspace member in an instant messaging platform;
detect, in the keyword string, a command to create an account managed by a computing server, the command triggering a process carried out through one or more automated texts at the instant messaging platform;
receive a user token associated with the command to create the account, the user token identifying the workspace member of the organization;
determine, using the user token, that the workspace member has an access privilege to create an account managed by a computing server, wherein the account is creatable through a first set of input fields in a software application operated by the computing server and is creatable through a second set of fields within the instant messaging platform, wherein at least one of the input fields in the second set corresponds to at least one of the input fields in the first set, and wherein the software application is different from the instant messaging platform;
cause the instant messaging platform to generate one or more automated texts in the instant messaging platform in response to the keyword string, the one or more automated texts prompting the workspace member to enter, in the instant messaging platform, information corresponding to the second set of input fields;

receive a set of responses to the one or more automated texts, the set of responses comprising information corresponding to the second set of input fields entered by the workspace member in the instant messaging platform; and automatically initiate an account creation process to create the account based on the information from the set of responses to the one or more automated texts.

19. The non-transitory computer readable medium of claim 18, wherein the instructions that cause the processor to automatically initiate the account creation process comprises instructions to:

determine a plurality of request approvers;

cause the instant messaging platform to request approval from a first of the plurality of request approvers; and request, at the computing server, approval from a second of the plurality of request approvers.

20. A system comprising:

an instant messaging platform configured to generate a messaging thread for a workspace member of an organization to submit a keyword string; and a computing server in communication with the instant messaging platform, the computing server comprising a processor and memory, the memory configured to store a set of code instructions, the set of code instructions, when executed by the processor, causes the processor to:

receive a keyword string from a workspace member of an organization, wherein the keyword string is entered by the workspace member in the instant messaging platform;

detecting, in the keyword string, a command to create an account managed by the computing server, the command triggering a process carried out through one or more automated texts at the instant messaging platform;

receive a user token associated with the command to create the account, the user token identifying the workspace member of the organization;

determine, using the user token, that the workspace member has an access privilege to create an account managed by the computing server, wherein the account is creatable through a first set of input fields in a software application operated by the computing server and is creatable through a second set of fields within the instant messaging platform, wherein at least one of the input fields in the second set corresponds to at least one of the input fields in the first set, and wherein the software application is different from the instant messaging platform;

cause the instant messaging platform to generate one or more automated texts in the instant messaging platform in response to the keyword string, the one or more automated texts prompting the workspace member to enter, in the instant messaging platform, information corresponding to the second set of input fields;

receive a set of responses to the one or more automated texts, the set of responses comprising information corresponding to the second set of input fields entered by the workspace member in the instant messaging platform; and automatically initiate an account creation process to create the account based on the information from the set of responses to the one or more automated texts.

* * * * *